(12) United States Patent
Shiba et al.

(10) Patent No.: US 6,785,200 B1
(45) Date of Patent: Aug. 31, 2004

(54) DIFFRACTION GRATING ELEMENT AND OPTICAL PICKUP DEVICE INCORPORATING THE SAME

(75) Inventors: Kazuo Shiba, Nagano (JP); Fumio Kobayashi, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 627 days.

(21) Appl. No.: 09/608,437

(22) Filed: Jun. 30, 2000

(30) Foreign Application Priority Data

Jul. 1, 1999 (JP) .......................................... 11-187339

(51) Int. Cl.[7] .............................................. G11B 7/00
(52) U.S. Cl. ............................... 369/44.14; 369/112.05
(58) Field of Search ........................... 369/44.15, 44.16, 369/44.19, 110.03, 112.02, 112.03, 112.04, 112.07, 244, 263, 44.14, 112.05

(56) References Cited

U.S. PATENT DOCUMENTS

| | | | | |
|---|---|---|---|---|
| 4,727,529 A | * | 2/1988 | Araki et al. | 369/44.32 |
| 4,794,580 A | * | 12/1988 | Ikedo et al. | 369/44.16 |
| 5,056,891 A | * | 10/1991 | Masunaga | 369/44.15 |
| 5,712,841 A | * | 1/1998 | Opheij et al. | 369/112.09 |
| 5,920,532 A | * | 7/1999 | Yagi et al. | 369/53.22 |
| 6,151,288 A | * | 11/2000 | Takei et al. | 369/112.04 |
| 6,178,155 B1 | * | 1/2001 | Ueda et al. | 369/244 |

FOREIGN PATENT DOCUMENTS

| | | | | |
|---|---|---|---|---|
| JP | 361080625 A | * | 4/1986 | |
| JP | 362157330 A | * | 7/1987 | |
| JP | 63-30801 | | 8/1988 | ............ F16B/1/02 |

* cited by examiner

Primary Examiner—Thang V. Tran
Assistant Examiner—Bach Vuong
(74) Attorney, Agent, or Firm—Sughrue Mion, PLLC

(57) ABSTRACT

A grating mounting section 10 for mounting a laser diode 3 and a diffraction grating element 8 is formed in a frame body 2 of an optical pickup device. The diffraction grating element 8 includes a main body 83 provided with a grating face 82, a holder 84 being integral with the main body 83 while surrounding the same, and an arm portion 81 protruded outward from the outer circumferential face of the holder 84 as viewed in the radial direction. The arm portion 81 is protruded outward through a groove 22 formed in the grating mounting section 10 of the frame body side. An angular position adjustment of the diffraction grating element 8 can be carried out by turning the arm portion 81 about the optical axis.

13 Claims, 3 Drawing Sheets

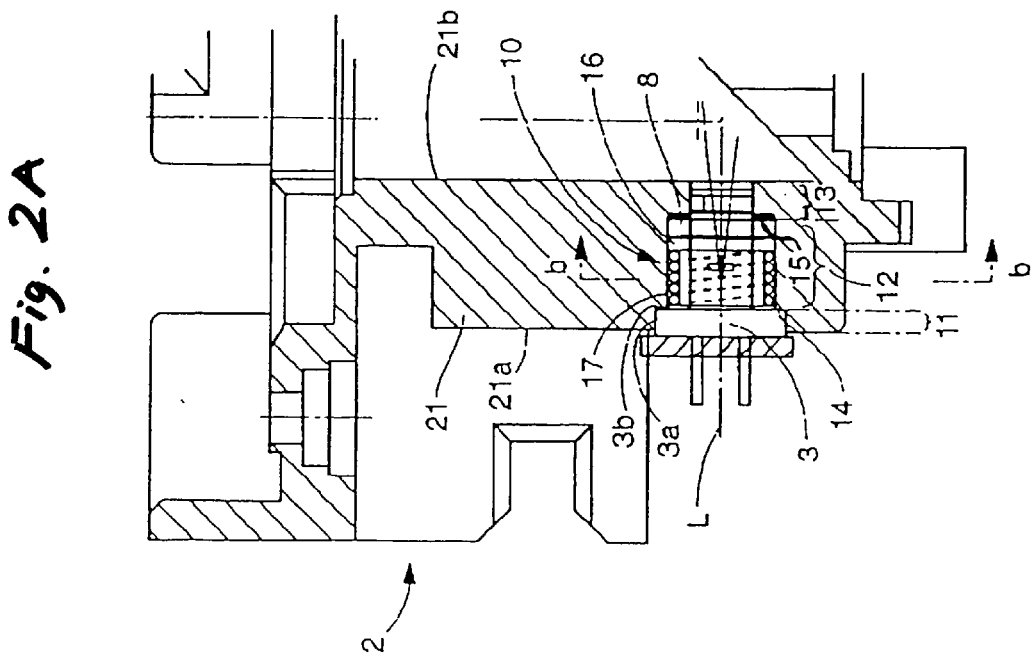

DIFFRACTION GRATING ELEMENT AND OPTICAL PICKUP DEVICE INCORPORATING THE SAME

BACKGROUND OF THE INVENTION

The present invention relates to a diffraction grating element used for generating three beams or the like for the tracking control in an optical pickup device for playing back a CD or the like. More particularly, the invention relates to a diffraction grating element with a mechanism for carrying out the positioning in a simple manner. Further, the invention relates to an optical pickup device with a mechanism by which the positioning of the diffraction grating element may be carried out in a simple manner.

In many optical pickup devices, which are used for recording and reproducing information to and from an optical recording medium, such as CD or DVD, a three beam method is employed in order to obtain a tracking error signal used for the tracking control.

In the 3-beam method, a laser beam emitted from a laser light source is diffracted by a diffraction grating element to produce three beams. Of those three beams, two sub beams are directed to a predetermined pit on a recording track of the optical recording medium at predetermined angles with respect to a tangential direction to the track. The amounts of the light beams reflected by the optical recording medium are detected by a photo detector. Those light amounts detected are compared to generate a tracking error signal.

Accordingly, it is necessary to adjust the diffracting directions of the diffraction grating element with high precision so that the two sub beams hit the pit at the target angles with respect to the track tangential direction. In other words, it is necessary to accurately adjust the diffracting directions of the grating element by turning the grating face of the grating element about the optical axis. If the angular adjusting accuracy is poor, an accuracy of the tracking error signal is deteriorated.

To cope with this, the related technique adopts a mechanism resembling an optical-component mounting adjustment structure, which is disclosed in Japanese Utility Model Publication No. 63-30801B, for the position adjustment of the grating element. In an example of the related technique, a holder which rotatably holds a diffraction grating element is inserted into a cylindrical mounting hole formed in a frame body of the optical pickup device. An eccentric pin is inserted into a groove formed on the outer circumferential surface of the holder, and the eccentric pin is turned about an eccentric shaft oriented orthogonally to the outer circumferential face of the holder. With rotation of the eccentric pin, the holder rotates about the optical axis, so that the grating element may be adjusted to a target angular position.

However, the related grating-element angular position adjusting mechanism using the eccentric pin has the following problems to be solved.

The groove, which is formed in the outer circumferential face of the holder into which the eccentric pin is to be inserted, needs a length containing a rotation locus of the eccentric pin as viewed in the optical axis direction. If the length is short, the eccentric pin will run out of the groove. This fact makes it impossible to reduce the holder length, and provides a hindrance in reducing the device size by reducing its installation space.

By the rotation of the eccentric pin that has been inserted into the holder, force exerts on the holder in the rotational direction, and further it is pressed in the optical axis direction. Because of the pressing force, sometimes, the holder having inserted into the mounting hole of the frame body slightly inclines with respect to the axial line of the mounting hole.

If the holder, while being inclined, is fastened to the mounting hole by adhesive, the optical axis of the grating element which is held by the holder is inclined with respect to the optical axis of the laser light source. A laser beam is refracted by the inclined grating element, and as a result, a light emitting position is off its normal position.

Further, if the holder, while being inclined, is fastened to the frame body by adhesive, the holder is likely to shift from its normal position because of hardening shrinkage and temperature shrinkage of the adhesive, and the like. In other words, the grating element held by the holder is likely to shift from its correction position.

Additionally, when the grating element is turned by the eccentric pin, a relatively large force is required, and hence its fine adjustment is difficult.

SUMMARY OF THE INVENTION

Accordingly, the first object of the present invention is to provide a diffraction grating element with a position adjusting mechanism capable of reducing the length of the grating element and the mounting section, and to provide an optical pickup device with the same mechanism.

The second object of the present invention is to provide a diffraction grating element provided with a position adjusting mechanism which is free from such an undesired circumstance that during the position adjustment, undesired forces act on the grating element side, and as a result, the grating element is inclined with respect to the optical axis, and to provide an optical pickup device with the same mechanism.

The third object of the invention is to provide a diffraction grating element provided with a position adjusting mechanism capable of making a simple position adjustment, and to provide an optical pickup device with the same mechanism.

In order to achieve the above objects, according to the present invention, an arm portion is formed protruding outward from a holder of a diffraction grating element, and the arm portion is protruded outside a frame body, whereby the diffraction grating element is angularly positioned by operating the arm portion.

In the configuration, a length of the diffraction grating element as viewed in the optical axis direction can be reduced when comparing with the related art in which the rotation adjustment of the diffraction grating element is carried out by the eccentric pin. This feature is advantageous in reducing a size of a device having the diffraction grating element assembled therein. In the invention, there is hardly forces act on the diffraction grating element in other directions than the rotational direction as in the case using the eccentric pin. Therefore, the optical pickup device of the invention successfully avoids such a problem that the diffraction grating element is mounted in a state that it is inclined to the optical axis.

Further, the holder includes an outer circumferential face formed thereon, which is used as a reference for the optical axis alignment. It further includes an annular end face formed thereon, which is used for the positioning in the optical axis direction. With the structure, the optical axis alignment and the positioning in the optical axis direction are carried out by merely attaching the diffraction grating element to the mounting section of the frame body side. As a result, the mounting work of the grating element is simple.

BRIEF DESCRIPTION OF THE DRAWINGS

In the accompanying drawings:

FIGS. 2A to 2C are a partially enlarged cross sectional view of a mounting section shown in FIG. 1, a partial cross sectional view taken on line b—b in FIG. 1, and an exploded, perspective view showing components and parts contained in the mounting section.

DETAILED DESCRIPTION OF THE PREFERRED EMBODIMENTS

An exemplar of an optical pickup device incorporating the present invention will be described with reference to the accompanying drawings.

Figure 1A:
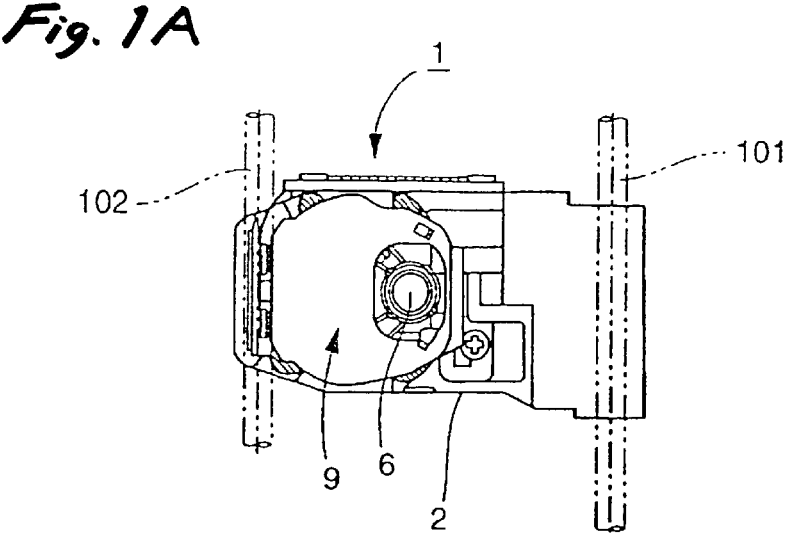
FIGS. 1A to 1C are a top plan view, side view and schematic, longitudinal sectional view of an optical pickup device according to one embodiment of the present invention.
Figure 1B:
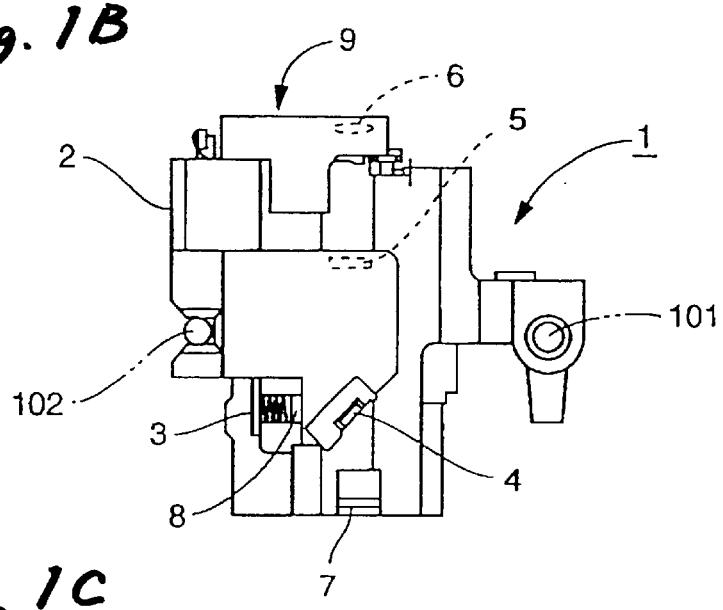
Figure 1C:
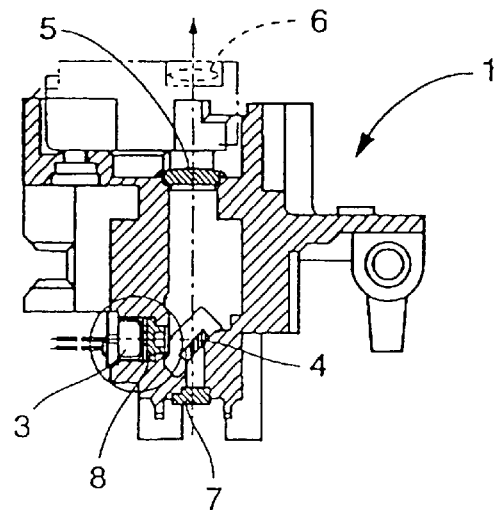
Figure 3A:
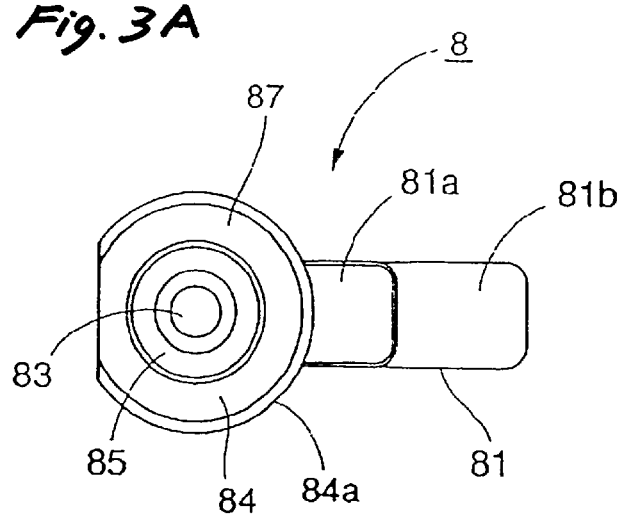
FIGS. 3A to 3D are a plan view, side view, and rear view showing the diffraction grating element FIG. 1, and a cross sectional view taken on line d—d shown in FIG. 3B.
Figure 3D:
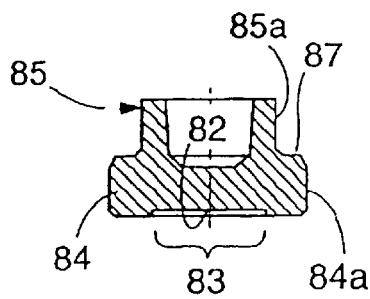
Figure 3B:
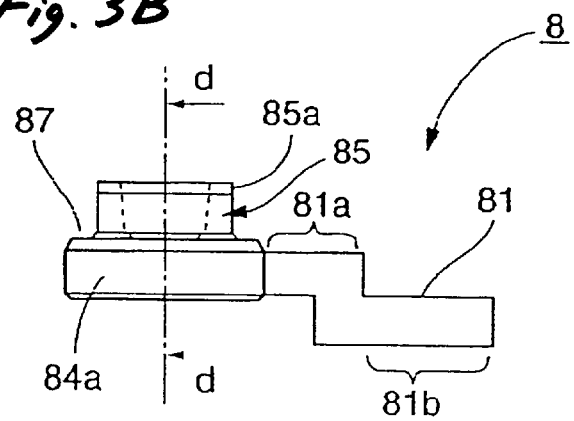
Figure 3C:
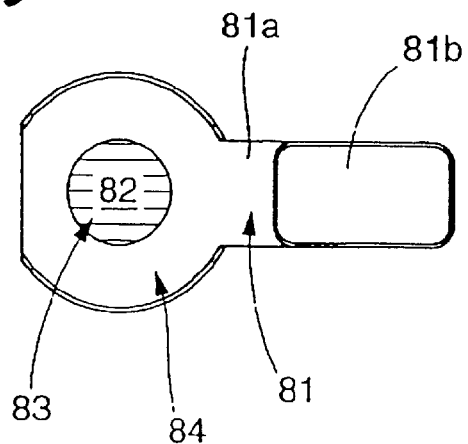

FIGS. 1A to 1C are a top plan view, side view and schematic, longitudinal sectional view of an optical pickup device according to one embodiment of the present invention. As shown in those figures, the optical pickup device 1 of the embodiment includes a main shaft 101 provided on a reproduction device for a CD or the like, and a frame body 2 slidable along a sub shaft 102. Optical components forming an optical system are mounted on the frame body 2.

As best illustrated in a schematic, longitudinal sectional view of FIG. 1C, the optical system of the optical pickup device 1 of the embodiment is made up of a laser diode 3, a half mirror 4 for directing upright a part of a laser beam emitted from the laser diode, a collimate lens 5 for collimating a laser beam reflected by the half mirror 4, an objective lens 6 for converging the collimated laser beam into a light spot on a recording face of an optical recording medium (not shown), and a photo detector 7 for receiving a return laser beam reflected by the optical recording medium through the half mirror 4. A diffraction grating element 8 for generating three beams used for the tracking control is disposed between the laser diode 3 and the half mirror 4.

The objective lens 6 is supported by an objective-lens driver 9 mounted on the upper end of the frame body 2. It is moved in a tracking direction and a focusing direction by the objective-lens driver 9 to correct a tracking error and a focusing error of a light spot formed on the optical recording medium. The tracking error is corrected by use of two beams, a sub beam and a reflecting beam, which are formed by the diffraction grating element 8 as mentioned above. The tracking error control by such a 3-beam method is known in this field, and no further description of it will be given in the specification.

FIG. 2 shows an enlarged mounting section for the laser diode 3 and the diffraction grating element 8, which are provided on the frame body 2.

The mounting section 10 is formed in a side wall 21 of the frame body 2 such that it passes therethrough while ranging from the outer face 21a of the side wall 21 to an inner face 21b. There are provided a large-diameter introduction hole 11 from which the laser diode 3 is press-fitted, a medium-diameter circular hole 12 in which the laser diode 3 and the diffraction grating element 8 is mounted, and a small-diameter circular hole 13 for positioning the diffraction grating element 8 in this order in the direction from the outer face 21a to the inner face 21b.

An annular end face 14 used for positioning the laser diode 3 is provided between the introduction hole 11 and the mounting hole 12. An annular end face 15 used for positioning the diffraction grating element 8 is provided between the mounting hole 12 and the positioning hole 13.

As best illustrated in FIG. 2C, the diffraction grating element 8, a washer 16 and the laser diode 3 are inserted, in this order, into the thus constructed mounting section 10.

As seen from FIG. 2B, in the mounting section 10 formed in the frame body 2, a groove 22 (arm receiving portion) of a predetermined width is formed while extending from its center (optical axis L) in the radial direction. An arm portion 81 of the diffraction grating element 8, narrower than the groove 22, passes through the groove 22 and is protruded outward therefrom.

FIGS. 3A to 3D are a plan view, side view, rear view, and a cross sectional view showing the diffraction grating element. As seen from those figures, the diffraction grating element 8 includes a main body 83 having a grating face 82 formed therein, a holder 84 formed integrally with the main body 83 while surrounding the same, a cylindrical portion 85 of small diameter which is integrally formed on the beam-emitting side end face of the holder 84, and the arm portion 81 protruding outward in the radial direction from a part of an outer circumferential face 84a of the holder 84.

An annular end face 87 is formed between the outer circumferential face 84a of the holder 84 and the cylindrical portion 85, and the end face 87 comes in contact with the annular end face 15 of the frame body 2. An outer circumferential face 85a of the cylindrical portion 85 is to be fit into the positioning hole 13 of the frame body 2.

The arm portion 81 is constructed such that its axis passes through the center (optical axis L) of the grating face 82, and includes a base end portion 81a located closer to the outer circumferential face of the holder 84 and a top end portion 81b stepwise extending from the top end of the base end portion 81a. The stepwise structure increases a rigidity of the arm portion 81. The stepped part is configured such that the top end portion 81b of the arm portion 81 is spaced apart from the side wall 21 of the frame body 2, which includes the groove 22 formed therein.

A procedure of assembling the laser diode 3 and the diffraction grating element 8 to the thus constructed mounting section 10 will be described. As described above, the diffraction grating element 8, the washer 16, a coiled spring 17 and the laser diode 3 are inserted in this order into the mounting section 10 from the outer face 21a side thereof (FIG. 2C).

The cylindrical portion 85 of the diffraction grating element 8 is press-fit into the positioning hole 13 of the mounting section 10, whereby an optical axis alignment is automatically performed. Since an outer circumferential face 3a of a stem portion of the laser diode 3, which is to be finally inserted, is press-fit with an inner face of the introduction hole 11, an optical axis alignment of the laser diode 3 is automatically performed by simply press-fitting the laser diode 3 into the mounting section 10 and fixing therein. Further, an annular end face 3b of the stem portion abuts against the annular end face 14 of the introduction hole 11, so that its positioning in the optical axis direction is also automatically performed.

By the press-fitting and fixing of the laser diode 3, the coiled spring 17 is compressed to urge the diffraction grating element 8 toward the laser beam emitting side, through the washer 16. As a result, the annular end face 87 of the diffraction grating element 8 is pressed against the annular end face 15, whereby its positioning in the optical axis direction is automatically performed.

Thereafter, the diffraction grating element 8 is positioned in the rotary direction by the utilization of the top end portion 81b of the arm portion 81 of the diffraction grating element 8, which is protruded from the groove 22 toward the frame body side. In this case, a jig 40 as indicated by a phantom line in FIG. 2C may be used. The jig 40 includes a rotary central shaft 41 and a coupling lever 42 extending from the top end of the shaft in the radial direction. The top end of the coupling lever 42 is bent forward. This bent portion includes a groove 43 formed therein to receive the top end portion 81b of the arm portion 81 of the diffraction grating element 8. The grating face 82 of the diffraction grating element 8 is angularly positioned as desired by turning the arm portion 81 received by the groove 43.

After the laser diode 3 and the diffraction grating element 8 are positioned, those components are bonded and fastened to the frame body by applying adhesive P therebetween. Adhesive is efficiently injected through a gap between the arm portion 81 and the groove 22. Here, the mounting work of those components is finished.

In the embodiment mentioned above, the diffraction grating element 8 is a one-piece molded product of plastic or the like. In an alternative, the main body 83 may be manufactured as a glass product, the holder provided with the arm portion may be manufactured as an annular plastic product in which the main body 83 is bonded to be held therein.

In the embodiment mentioned above, the diffraction grating element 8 is urged by an urging member including the washer and the coiled spring. It is evident that any other urging member than the coiled spring may be used for the same purpose.

While in the above-mentioned embodiment, a grating component constructed according to the present invention is applied to the optical pickup device, it is readily understood that the grating component of the invention may be used for a grating element used in any other optical product than the optical pickup device.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A diffraction grating element comprising:
   a main body provided with a diffraction grating face,
   a holder integrally formed with the main body for holding an outer periphery of the main body, the holder having a cylindrical outer face an axis of which is coincident with an optical axis of the diffraction grating face; and
   an arm portion integrally formed with the holder so as to protrudes outward from the outer face of the holder, wherein the main body, the holder and the arm portion are integrally formed as a monolithic structure.

2. An optical pickup device for recording/reproducing information recorded on a recording surface of an optical recording medium based on reflected light from the recording surface, comprising:
   a diffraction grating element for producing a plurality of laser light spots by diffracting laser light emitted from a laser light source in order to perform a tracking control in which the laser light is focused onto a desired track on the recording surface to derive the reflected light, the diffraction grating element comprising:
   a main body provided with a diffraction grating face;
   a holder for holding an outer periphery of the main body, the holder having a first cylindrical outer face an axis of which is coincident with an optical axis of the diffraction grating face; and
   an arm portion protruded outward from the first cylindrical outer face of the holder, wherein the main body, the holder and the arm portion are integrally formed as a monolithic structure; and
   a frame body comprising:
   a cylindrical mounting hole having a first diameter for rotatably supporting the holder of the diffraction grating element therein; and
   an arm receiver for receiving the arm portion of the diffraction grating element such that the arm portion is movable in the circumferential direction of the diffraction grating element about the optical axis in order to perform an angular position adjustment of the main body of the diffraction grating element.

3. The optical pickup device as set forth in claim 2, wherein the diffraction grating element includes a cylindrical portion having a second cylindrical outer face situated closer to a light-emitting side of the element than the holder, and having a smaller diameter than the first cylindrical outer face; and
   wherein the frame body includes a cylindrical positioning hole having a second diameter smaller than the first diameter, into which the cylindrical portion is fit.

4. The optical pickup device as set forth in claim 3, wherein the holder and the cylindrical portion are continuously formed so as to define a first stepwise annular end face therebetween; and
   wherein the mounting hole and the positioning hole are continuously formed so as to define a second stepwise annular end face therebetween, against which the first end face is abutted when the cylindrical portion is fit into the positioning hole.

5. The optical pickup device as set forth in claim 4, further comprising an urging member for urging the first end face of the diffraction grating element against the second end face of the frame body.

6. The optical pickup device as set forth in claim 5, wherein the frame body includes an introduction hole continuously and coaxially formed with the mounting hole so as to have a third diameter larger than the first diameter;
   wherein the diffraction grating element, the urging member and the laser light source is inserted from the introduction hole in order; and
   wherein the first end face of the diffraction grating element is urged against the second end face of the frame body via the urging member by press-fitting the laser light source into the introduction hole.

7. The optical pickup device as set forth in claim 2, wherein the diffraction grating element is integrally formed by a resin material.

8. The optical pickup device as set forth in claim 6, wherein the urging member includes a washer and a coiled spring which is compressed by press-fitting the laser light source into the introduction hole.

9. The optical pickup device as set forth in claim 3, wherein the second diameter is substantially identical with the diameter of the second cylindrical outer face of the diffraction grating element.

10. The optical pickup device as set forth in claim 6, wherein the laser light source has a first cylindrical outer face and a second cylindrical outer face having a larger diameter than the first cylindrical outer face so as to define a third stepwise annular end face therebetween;

wherein the mounting hole and the introduction hole are continuously formed so as to define a fourth stepwise annular end face therebetween, against which the third end face is abutted when the laser light source is press-fit into the introduction hole.

11. The optical pickup device as set forth in claim 10, wherein the third diameter is substantially identical with the diameter of the second cylindrical outer face of the laser light source.

12. A diffraction grating element comprising:

a main body provided with a diffraction grating face, a holder integrally formed with the main body for holding an outer periphery of the main body, the holder having a cylindrical outer face an axis of which is coincident with an optical axis of the diffraction grating face; and an arm portion integrally formed with the holder so as to protrudes outward from the outer face of the holder, wherein the arm portion includes a base end portion extending in a radial direction from an outer circumferential face of the holder and a top end portion stepwise extending in the radial direction from the base end portion, wherein a central axis of the base end portion and the top end portion pass through the optical axis of the diffraction grating face.

13. An optical pickup device for recording/reproducing information recorded on a recording surface of an optical recording medium based on reflected light from the recording surface, comprising:

a diffraction grating element for producing a plurality of laser light spots by diffracting laser light emitted from a laser light source in order to perform a tracking control in which the laser light is focused onto a desired track on the recording surface to derive the reflected light, the diffraction grating element comprising:

a main body provided with a diffraction grating face;

a holder for holding an outer periphery of the main body, the holder having a first cylindrical outer face an axis of which is coincident with an optical axis of the diffraction grating face; and an arm portion protruded outward from the first cylindrical outer face of the holder, wherein the main body; and a frame body comprising:

a cylindrical mounting hole having a first diameter for rotatable supporting the holder of the diffraction grating element therein; and an arm receiver for receiving the arm portion of the diffraction grating element such that the arm portion is movable in the circumferential direction of the diffraction grating element about the optical axis in order to perform an angular position adjustment of the main body of the diffraction grating element, wherein the arm portion includes a base end portion extending in a radial direction from an outer circumferential face of the holder and a top end portion stepwise extending in the radial direction from the base end portion, wherein a central axis of the base end portion and the top end portion pass through the optical axis of the diffraction grating face.

* * * * *